(12) United States Patent
Gladstone et al.

(10) Patent No.: US 9,503,460 B2
(45) Date of Patent: Nov. 22, 2016

(54) SYSTEM AND METHOD FOR MANAGING ACCESS FOR TRUSTED AND UNTRUSTED APPLICATIONS

(75) Inventors: Philip J. S. Gladstone, Carlisle, MA (US); Morris J. Katz, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 428 days.

(21) Appl. No.: 13/272,646

(22) Filed: Oct. 13, 2011

(65) Prior Publication Data

US 2013/0097318 A1    Apr. 18, 2013

(51) Int. Cl.
*G06F 15/173*     (2006.01)
*H04L 29/06*      (2006.01)

(52) U.S. Cl.
CPC ......... *H04L 63/107* (2013.01); *H04L 63/0272* (2013.01)

(58) Field of Classification Search
CPC .................. H04L 63/107; H04L 63/0272
USPC ......................................................... 709/226
See application file for complete search history.

(56) References Cited

U.S. PATENT DOCUMENTS

| | | | |
|---|---|---|---|
| 8,095,786 B1 | 1/2012 | Kshirsagar | |
| 8,321,949 B1* | 11/2012 | Green et al. | 726/26 |
| 8,479,266 B1* | 7/2013 | Delker et al. | 726/4 |
| 8,495,731 B1* | 7/2013 | Mar et al. | 726/21 |
| 8,522,025 B2* | 8/2013 | Lakshmeshwar et al. | 713/170 |
| 2002/0099952 A1* | 7/2002 | Lambert et al. | 713/200 |
| 2004/0225895 A1* | 11/2004 | Mukherjee et al. | 713/201 |
| 2005/0210035 A1 | 9/2005 | Kester | |
| 2006/0094400 A1* | 5/2006 | Beachem et al. | 455/410 |
| 2006/0265737 A1* | 11/2006 | Morris | 726/3 |
| 2007/0011725 A1* | 1/2007 | Sahay et al. | 726/4 |
| 2007/0107043 A1* | 5/2007 | Newstadt et al. | 726/2 |
| 2007/0150939 A1* | 6/2007 | Aaron | H04L 63/126 726/3 |
| 2007/0150946 A1* | 6/2007 | Hanberger et al. | 726/15 |
| 2008/0034418 A1 | 2/2008 | Venkatraman | |
| 2008/0046965 A1* | 2/2008 | Wright et al. | 726/1 |

(Continued)

FOREIGN PATENT DOCUMENTS

| | | |
|---|---|---|
| WO | WO2006124832 | 11/2006 |
| WO | WO2013/055421 | 4/2013 |

OTHER PUBLICATIONS

PCT Oct. 30, 2012 International Search Report and Written Opinion of the International Searching Authority from International Application No. PCT/US2012/046492; 13 pages.

(Continued)

*Primary Examiner* — Philip Chea
*Assistant Examiner* — Wing Ma
(74) *Attorney, Agent, or Firm* — Patent Capital Group

(57) ABSTRACT

A method is provided in one example embodiment and includes identifying a network location of an endpoint, which is attempting to initiate an application; identifying whether the endpoint is operating in an enterprise environment; determining whether the application is trusted based on metadata associated with the application; and provisioning a tunnel for data traffic associated with the application. In more detailed implementations, the tunnel can be provisioned if the application is trusted and the endpoint is outside of an enterprise environment. In addition, the tunnel can be provisioned if the application is untrusted and the endpoint is within an enterprise environment.

21 Claims, 5 Drawing Sheets

(56) References Cited

U.S. PATENT DOCUMENTS

| | | |
|---|---|---|
| 2008/0046994 A1* | 2/2008 | Venkatraman et al. ........ 726/15 |
| 2009/0210702 A1* | 8/2009 | Welingkar et al. ........... 713/156 |
| 2010/0153696 A1* | 6/2010 | Beachem et al. ................ 713/2 |
| 2010/0235514 A1* | 9/2010 | Beachem ..................... 709/227 |
| 2010/0293610 A1 | 11/2010 | Beachem |
| 2011/0010759 A1 | 1/2011 | Adler |
| 2011/0083174 A1* | 4/2011 | Aldridge et al. ............... 726/12 |
| 2011/0209217 A1 | 8/2011 | Miyama |
| 2012/0030750 A1* | 2/2012 | Bhargava et al. .............. 726/13 |
| 2013/0054962 A1* | 2/2013 | Chawla et al. ............... 713/156 |
| 2013/0055347 A1* | 2/2013 | Chawla et al. .................. 726/3 |

OTHER PUBLICATIONS

PCT Apr. 15, 2014 International Preliminary Report on Patentability from International Application No. PCT/US2012/046492.

* cited by examiner

FIG. 3

| NAME | TRUSTED/ UNTRUSTED | DOWNLOADS | ORIGIN | MANUFACTURERS | METADATA | TYPE OF APP REPUTATION |
|---|---|---|---|---|---|---|
| CISCO DIRECTORY | T | 10,073,214 | US | CISCO | XXX | EXCELLENT |
| BEER APPLICATION | U | 79 | GERMANY | HEFEWEIZEN | XX | POOR |
| SALESFORCE VERSION 1.3 | T | 7,748,932 | US | SALESFORCE | XXXX | EXCELLENT |
| ONLINE DATING APPLICATION | U | 11,486 | UK | MATCHMAKER | XXX | AVERAGE |
| ORACLE | T | 42,835,214 | US | ORACLE | XXXXX | EXCELLENT |
| ... | ... | ... | ... | ... | ... | ... |

SYSTEM AND METHOD FOR MANAGING ACCESS FOR TRUSTED AND UNTRUSTED APPLICATIONS

TECHNICAL FIELD

This disclosure relates in general to application management, and more particularly, to a system and a method for managing access for trusted and untrusted applications.

BACKGROUND

The application market has grown exponentially in recent years. Applications generally include computer software designed to perform specific electronic tasks. For example, applications can include enterprise software, accounting software, office suites, graphics software, media players, educational software, simulation software, entertainment software, etc. Separately, smartphones have become ubiquitous, as their sales have eclipsed personal computer sales. Smartphones typically serve two distinct roles: providing work functionalities (e.g., e-mail platforms), and providing personal use capabilities (e.g., watching videos, playing games, etc.).

While most applications are benign and function as would be expected by the software community, a small percentage of applications are malicious. Unfortunately, smartphones that use such applications are commonly granted unfettered access to their user's enterprise environments. Thus, implementing a security paradigm with the capacity to monitor applications and to manage their access to enterprise data presents significant challenges to developers, manufacturers, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified table illustrating example application characteristics that may be evaluated in the communication system.

DETAILED DESCRIPTION OF EXAMPLE EMBODIMENTS

Overview

A method is provided in one example embodiment and includes identifying a network location of an endpoint, which is attempting to initiate an application; identifying whether the endpoint is operating in an enterprise environment (i.e., any environment in which there could be sensitive or confidential information); determining whether the application is trusted based on metadata associated with the application; and provisioning a tunnel for data traffic associated with the application. In more detailed implementations, the tunnel can be provisioned if the application is trusted and the endpoint is outside of the enterprise environment. In addition, the tunnel can be provisioned if the application is untrusted and the endpoint is within the enterprise environment.

An application characteristic can be used in order to identify whether the application is trusted. The application characteristic can include a characteristic associated with a number of downloads associated with the application; a characteristic associated with an origin of the application; a characteristic associated with a manufacturer of the application; or a reputational characteristic associated with the application.

In certain cases, at least some data traffic can be routed based on virtual local area network (VLAN) markings. In addition, the endpoint can be configured to download a list of application hashes, which are used to identify whether a subsequent application is trusted. In yet other instances, a remote query can be sent when attempting to initiate the application in order to receive a policy designating how the data traffic is to be routed in a network. The network location can be identified using a network admission control element.

Example Embodiments

Figure 1:
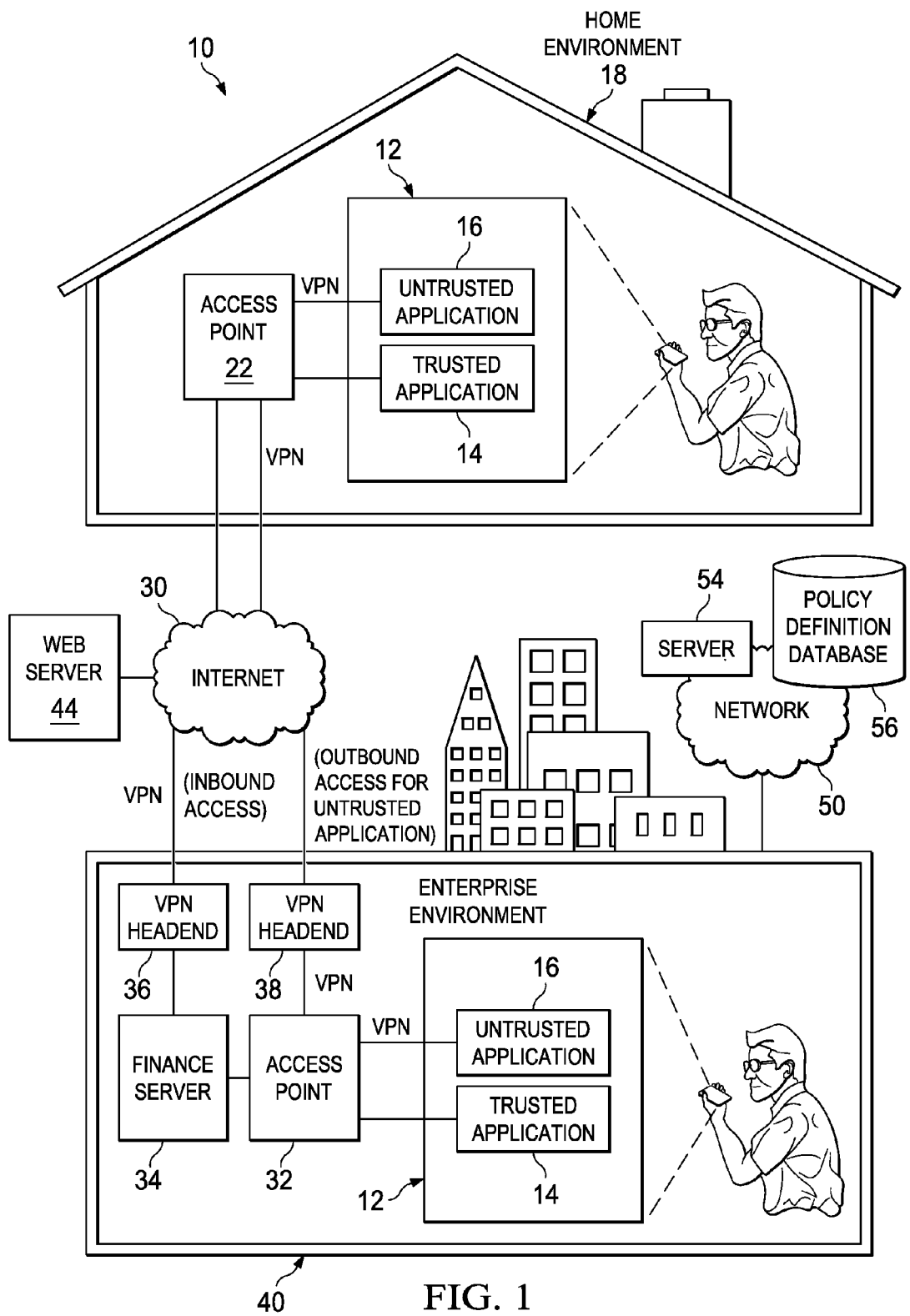
FIG. 1 is a simplified block diagram illustrating an example embodiment of a communication system according to the present disclosure.

Turning to FIG. 1, FIG. 1 is a simplified block diagram of an example embodiment of a communication system 10 for managing access for trusted and untrusted applications in a network environment. In this particular example, FIG. 1 illustrates an endpoint 12 being operated by an end user in a home environment 18. Endpoint 12 may include a trusted application 14 and an untrusted application 16. Trusted application 14 may be associated with a residential environment, or reflective of a public WiFi, or any other suitable location for executing a given application. Endpoint 12 may readily achieve connectivity to an Internet 30 via an access point 22.

FIG. 1 also includes an enterprise environment 40, which can include an access point 32, a finance server 34, and a set of virtual private network (VPN) headends 36, 38, which have connections to Internet 30. In certain implementations, VPN headends 36 and 38 are consolidated into a single element. FIG. 1 also includes a web server 44, which in this embodiment offers entertainment content (e.g., game applications) to be consumed by an end user of endpoint 12. In addition, FIG. 1 illustrates a network 50 in which a server 54 and a policy definition database 56 are provisioned. Enterprise environment 40 may readily achieve connectivity to network 50 and to Internet 30.

Each of the elements of FIG. 1 may couple to one another through any suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In operational terms, a given end user is free to roam to his associated enterprise and operate endpoint 12 in order to perform tasks that implicate enterprise data. Endpoint 12 is configured to maintain a network connection regardless of its location. Most smartphones have VPN software provisioned on them and this allows the smartphone to readily attach to enterprise environment 40. Hence, unconditional access can be easily achieved by applications in endpoint 12.

This can be worrisome because security professionals view this unregulated access to enterprise data as a significant security concern. In a worst-case scenario, as a user treats their endpoint 12 as a personal device (e.g., for downloading games, trivial entertainment applications, etc.), the applications are indirectly brought into enterprise environment 40. These applications can then have full access to enterprise resources, which poses a security threat. For example, one recently-reported malicious application involved a simple wallpaper download, which indirectly triggered a surreptitious gathering of privileged information associated with the endpoint at which the download occurred. The privileged information was then forwarded back to a server for unauthorized dissemination of the privileged information.

Note that in many instances, applications can routinely check current weather forecasts, update stock charts, receive e-mail messages, etc. It becomes easy for an application developer to provide hooks in an application that hack into privileged information (e.g., scan information in enterprise environment 40). This breach commonly occurs without the user's knowledge or consent. Thus, applications have the power to exploit enterprise access, for example, in order to export information from the enterprise, to act as a proxy for remote snooping into the enterprise, to engender data leakage more generally, etc.

In accordance with the teachings of the present disclosure, communication system 10 is configured to ensure that trusted traffic is permitted rightful access to resources on enterprise networks, while untrusted traffic is suitably isolated such that it is appropriately restricted from sensitive data. In specific implementations, communication system 10 can employ tunnel technology (e.g., VPN technology) to associate trusted applications to trusted infrastructure, and similarly use VPN technology to isolate untrusted applications such that they are not harmful to enterprise environment 40.

VPN tunnels are typically used in order to grant access to enterprise data and, hence, the same symmetrical relationship is being employed by communication system 10. For example, in the outbound direction (which is illustrated in FIG. 1), an untrusted application initiated in enterprise environment 40 can run over a VPN tunnel to Internet 30. In this sense, VPN technology is being used to isolate an untrusted application. Similarly, in the inbound direction (also illustrated in FIG. 1), a VPN tunnel can effectively be used for trusted applications, which are free to access enterprise data.

In operation, communication system 10 can effectively discriminate between trusted and untrusted applications being initiated by endpoint 12. In specific implementations, application metadata is leveraged in order to determine when and how to tunnel the traffic associated with specific applications. Metadata of a given application can be used to link particular applications to particular policies. For example, when endpoint 12 is operating inside enterprise environment 40, the non-enterprise applications (i.e., untrusted applications) would be tunneled to the enterprise edge for access to Internet 30. In this fashion, VPN technology is being used to isolate potentially harmful applications from accessing the enterprise data. If the user of endpoint 12 were initiating a trusted application in this same scenario, then VPN tunneling would not be necessary. There would be a free flow of traffic between enterprise resources and the trusted applications of endpoint 12.

Conversely, when endpoint 12 is not operating in enterprise environment 40, the enterprise applications (i.e., the trusted applications) can be tunneled to the enterprise firewall for access to enterprise data. For non-enterprise applications (i.e., the untrusted applications), traffic would not run over VPN tunnels, but instead propagate toward public resources (e.g., Internet 30). In alternative embodiments, enterprise applications can be signed by a unique enterprise-specific key, which would denote them as trusted. Those untrusted applications without the key would be relegated to the traffic management scenarios outlined above, which would not expose sensitive data of the enterprise.

In operation of a simplistic example, when endpoint 12 connects to a network, a network location determination is made (e.g., whether endpoint 12 is on the public Internet, operating in a privileged environment, operating in the enterprise, etc.). Note that the network itself may perform checks on endpoint 12 to decide if it should be placed on an external VLAN or an internal VLAN. For purposes of this example, anything that is not considered a privileged environment can be considered the public Internet. In cases where endpoint 12 is operating in the public Internet, then a VPN tunnel can be established to the home enterprise headend. [The term 'tunnel' is meant to encompass any type of link, pathway, connection, etc. for data traffic.] Trusted applications can then pass their traffic down this VPN tunnel. Untrusted applications can achieve direct access to the public Internet, which would pose no security threat to the enterprise resources.

In cases where endpoint 12 is operating in a privileged environment and the application is untrusted, then a VPN tunnel is again established to the home enterprise headend. Additionally, an indication is provided that this tunnel is designated for untrusted applications. This tunnel can provide access to the public Internet for untrusted applications, whereas trusted applications can achieve a direct access to the enterprise resources. In this manner, untrusted applications are prohibited from accessing sensitive data in the enterprise network, and trusted applications can be rightfully granted access to the enterprise resources sought to be used by an end user.

One aspect of the architecture involves differentially routing traffic based on how applications are marked (e.g., using VPN technologies, using virtual local area network (VLAN) technologies, using Locator Identifier Separation Protocol (LISP) technologies, etc.). Note that any appropriate tunnel can be used in conjunction with the present disclosure. For example, the connection from the endpoint inside the organization (to the Internet) does not have to be private. For this reason, the architecture outlined herein could use any number of tunneling types (e.g., a VPN Tunnel, an LISP tunnel, a VLAN tunnel, a generic routing encapsulation (GRE) tunnel, etc.), all of which are encompassed by the teachings of the present disclosure.

Another aspect of the architecture can involve classifying applications in order to perform differential routing (e.g., using signatures, using administrator/IT provisioning, using an application store entry, using a name-based inspection, etc.). In alternative embodiments, rather than use a VPN characteristic to mark specific packets when endpoints are operating inside the enterprise, packets could be marked in a different way, where the network infrastructure would recognize these markings and route traffic accordingly.

In certain implementations, communication system 10 can be used with a home VPN/firewall configuration to differentially allow access directly to the home network, or to the service provider's (SP's) network. Additionally, communication system 10 can be used in conjunction with multiple different VPN headends for controlling access to assets on different networks (e.g., based on policies associated with each of those networks). For example, applications might VPN into the corporate network, into a home network, or be placed on a public network (e.g., based on a determination of the destination location, an identification of the source of policies for access to that destination, etc.). The enforcement of policies would result in a decision whether to route the applications' traffic over a VPN. In this case, if an application were sending packets to different destinations, not all the traffic would necessarily receive the same treatment, with certain traffic being routed over different VPNs depending on the applicable policies (and/or the combinations thereof).

Any number of approaches can be employed to distinguish trusted/untrusted applications. For example, one approach to distinguishing the two classes of applications can be for an enforcement client to download a list of application hashes from the headend (e.g., whenever endpoint 12 connects to a network). Hence, certain hashes can be systematically distributed to individual endpoints. This may require updated applications to have their new hashes pushed out to an appropriate repository (e.g., to policy definition database 56, to policy definition module 62, etc.). Note also that such functionality could be readily integrated into an enterprise application store.

A second approach to distinguishing trusted/untrusted applications can involve signed versions of applications, where only applications that were signed by the enterprise would be permitted access to enterprise data. The signing can be performed as part of loading the application into the enterprise application store. A third approach can involve a remote query. For example, whenever a new application starts, the hash (or other information) could be sent to a predefined location (e.g., to some internal location in the endpoint itself, to a designated location in the network, etc.). Subsequently, a policy would be returned for that application. This model would centralize the maintenance of an 'authorized application' database (e.g., such as that which could be provisioned as policy definition database 56).

Note that with some cooperation from the headend, a single tunnel can be established for either inbound access or outbound access, with the headend indicating whether the client is inside or outside enterprise environment 40. Alternatively, in environments in which there is control over the application platform and application installation, trusted applications could be securely marked (i.e., signed), as discussed above. Once installed, the platform would record the installed application as being trusted. Richer tags could be used to achieve a granular control over access to enterprise resources (e.g., in contrast to binary delineations for trusted/untrusted). The metadata discussed herein could involve cryptography, digital signatures, public/private keys, proprietary mechanisms, etc.

Additionally, the architecture of the present disclosure encompasses scenarios in which a given endpoint can tag outgoing packets, where enforcement can occur at various places in the network (e.g., based on the trusted/untrusted tags). For example, one deployment could involve an endpoint applying tags (e.g., TrustSec tags) and then ensuring the packets only propagated to trusted (e.g., legitimate) parts of the network. This could be enforced via firewalling based on the tags (e.g., TrustSec tags). In certain scenarios, a security group tag (SGT) mechanism could be used in conjunction with the tunneling mechanisms of the present disclosure.

In a particular example, the tunneling can be enforced at a socket level (i.e., where a user context may exist). For example, on a Linux platform (e.g., in the context of Android scenarios), the kernel facility (e.g., of the IP table) can deliver user ID information along with the packets. Additionally, it is common feature on most mobile platforms that the user ID corresponds to the actual application (e.g., through the mapping from a specific numerical user ID to an application on a per-endpoint basis). In the cases where a provider owns the platform (e.g., a hard phone), then a tight integration can be formed with the operating system (OS) kernel. Additionally, the present disclosure encompasses scenarios in which a trusted OS and a trusted network can coordinate in order to pass tags and perform enforcement activities for application management.

Note that embodiments of communication system 10 are not choosing the tunneling option by destination address, but by source application. In such scenarios, certain applications are tunneled, whereas others are not. This stands in contrast to classic split tunneling being controlled by destination address for connectivity purposes. Instead, the controls discussed herein are different in that they are application based and, accordingly, are serving a different purpose in addressing security loopholes in enterprise environments.

In alternative embodiments (and in the context of evaluating how to appropriately route traffic), if the enterprise is responsible for the platform being triggered by endpoint 12, then the subsequent routing decision is more straightforward. For example, if the operating system is being controlled by Oracle, then when an Oracle employee initiates an application on a smartphone, his corresponding policy module in endpoint 12 can simply verify whether the particular application is trusted or untrusted (potentially designated by a single bit). If the application were trusted, then the application would be allowed to proceed to access enterprise data. If the application were untrusted, then the routing decisions would be different, as described above. In those situations where a provider owns the platform, then the routing decisions can be simplified, as a list of trusted applications can be predefined.

Note that in alternative embodiments, communication system 10 can account for the use of plugins in its activities. For example, the architecture can treat each (dynamically) loaded plugin as its own application. If the policy for the combined application is to permit internal access (and require external access), then one appropriate response might be to deny access entirely. Other approaches can involve denying an internal application access to a plugin that requires external access. In essence, the possible use cases for plugins can be controlled by policy provisioning in a manner similar to that discussed above for applications.

Before turning to some of the additional operations of communication system 10, a brief discussion is provided about some of the infrastructure of FIG. 1. The term 'endpoint' is a broad term representative of devices used to initiate a communication such as a mobile telephone, a personal digital assistant (PDA), a Cius tablet, an iPhone, an iPad, an Android device, any other type of smartphone, a laptop computer, a desktop personal computer, or any other device, component, element, or object capable of initiating or exchanging data within communication system 10. Endpoint 12 may also be inclusive of a suitable interface to an end user, such as a microphone, a keyboard, a webcam, etc.

Data, as used herein, refers to any type of video, numeric, voice, or script data, or any type of source or object code, or any other suitable information in any appropriate format that may be communicated from one point to another. One example implementation relating to endpoint 12 is provided below with reference to FIG. 2A.

Network 50 and Internet 30 represent a series of points or nodes of interconnected communication paths for receiving and transmitting packets of information that propagates through communication system 10. Network 50 and Internet 30 can offer a communicative interface between endpoint 12 and other network elements (e.g., web server 44), and may be any local area network (LAN), Intranet, extranet, wireless local area network (WLAN), metropolitan area network (MAN), wide area network (WAN), VLAN, VPN, or any other appropriate architecture or system that facilitates communications in a network environment. Communication system 10 may facilitate or otherwise implement a UDP/IP connection and use a TCP/IP communication protocol in particular embodiments. However, the architecture may alternatively implement any other suitable communication protocol for transmitting and receiving data packets within communication system 10. Network 50 and Internet 30 may foster any communications involving services, content, video, voice, or data more generally, as it is exchanged between end users and various network elements.

Figure 2A:
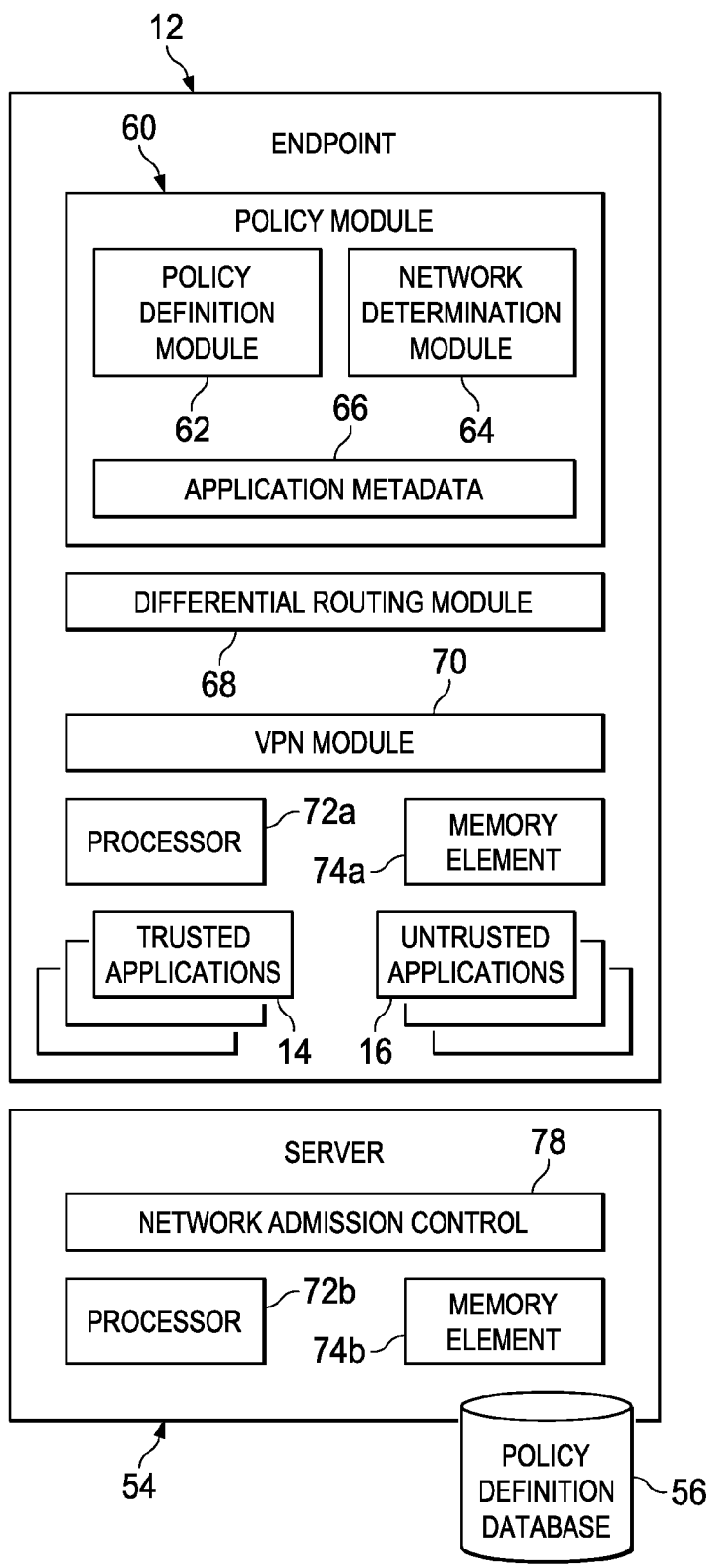
FIG. 2A is a simplified block diagram illustrating additional details that may be associated with an embodiment of the communication system.

Turning to FIG. 2A, FIG. 2A is a simplified block diagram illustrating one possible set of details associated with endpoint 12 and server 54 of communication system 10. Note that any one or more of the internal items of endpoint 12 and server 54 (as shown in FIG. 2A) may be consolidated, eliminated entirely, or varied considerably, where those modifications may be made based on particular communication needs, specific protocols, certain signaling models, etc. In the example implementation of FIG. 2A, endpoint 12 may include a policy module 60, which includes a policy definition module 62, a network determination module 64, and an application metadata element 66. Additionally, endpoint 12 may include a differential routing module 68, a VPN module 70, a processor 72a, and a memory element 74a. Differential routing module 68 is configured to allocate traffic over VPN tunnels, or over a standard link (e.g., to an Internet). Endpoint 12 is also being depicted as including trusted applications 14 and untrusted applications 16.

In this example implementation of FIG. 2A, server 54 may include a network admission control 78, a processor 72b, and a memory element 74b. Server 54 has a suitable coupling to policy definition database 56, which can be systematically updated with current definitions for policies that outline traffic management activities for certain applications. In certain example implementations, network admission control 78 may check to see whether the policy software is provisioned in a given endpoint. For example, if no instance of policy module 60 is being used by a given endpoint, then server 54 could force a download of such software by endpoint 12. This could be part of a compliance feature in cooperation with the application management paradigm being outlined herein.

Figure 2B:
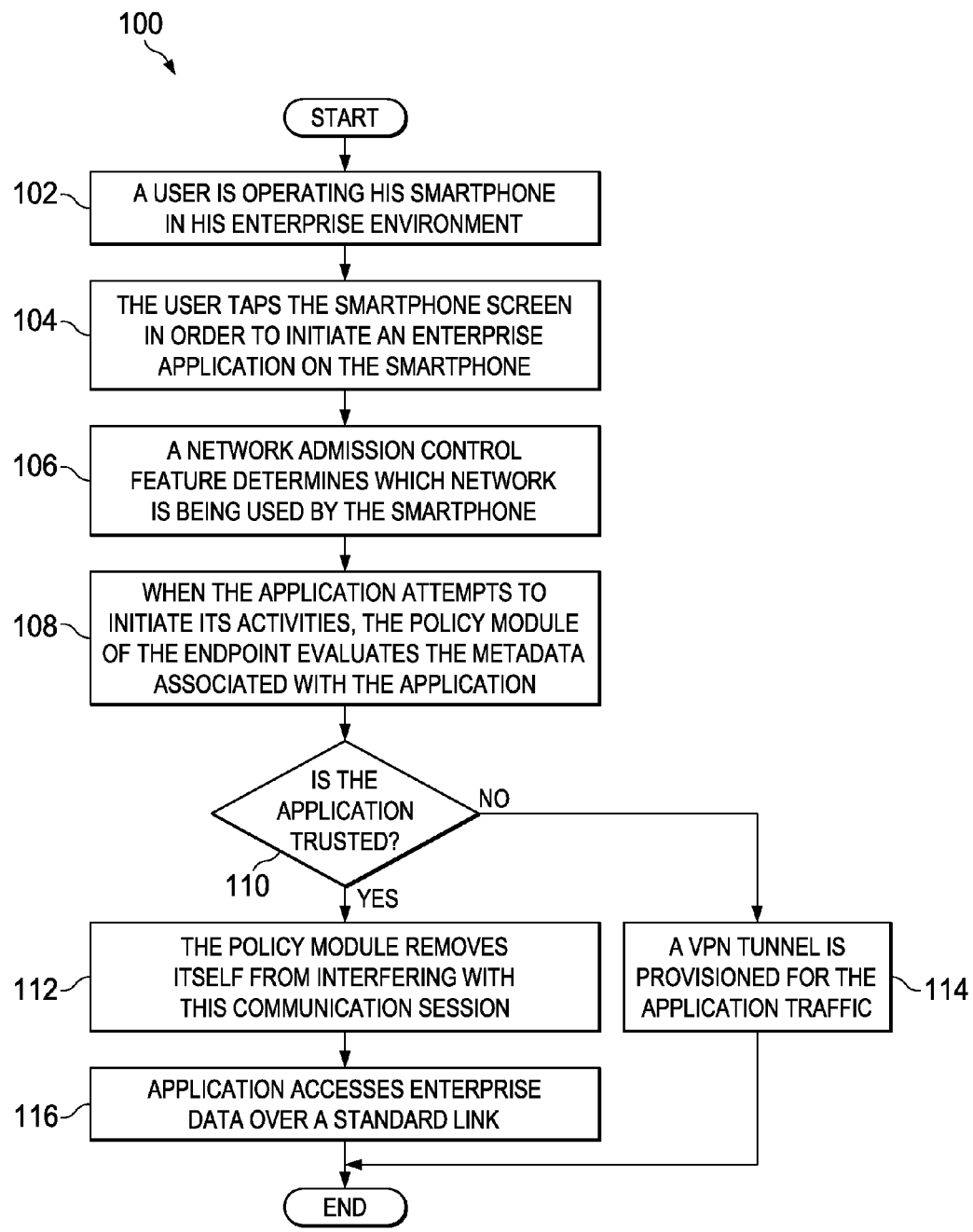
FIG. 2B is a simplified flowchart that illustrates potential operations that may be associated with an embodiment of the communication system.

FIG. 2B is a simplified flowchart 100 illustrating one set of possible operations associated with communication system 10. In this particular example, a user is operating his smartphone in his enterprise environment, as shown in 102. At 104, the user taps the smartphone screen in order to initiate an enterprise application on the smartphone. The smartphone would respond to this request by attempting to initiate the selected application. This particular application is associated with technical research that the user is performing as part of his job responsibilities as an engineer. Hence, clearly this enterprise application should be granted access to enterprise data.

Note that before the individual application is evaluated, a network admission control feature can determine a network location (e.g., which network is being used by the smartphone, as shown in 106). This determination can readily identify whether the smartphone is within, or outside of, the enterprise environment. For example, if the user were in his enterprise environment (e.g., his employer's office), then a corresponding enterprise policy would be applied for this particular application. Note also that this location determination can be performed by the endpoint itself (e.g., using network determination module 64), performed by server 54, or performed by any other suitable element.

When the application attempts to initiate its activities (e.g., accessing the network, requesting enterprise information, etc.), policy module 60 of endpoint 12 is configured to evaluate the metadata associated with the application. This is being shown in 108 of FIG. 2B. The metadata can include signature information, hash information, cryptographic data, and any type of proprietary marking that differentiates untrusted versus trusted applications. This evaluation causes a decision to be made whether the application is trusted such that it may gain access to the enterprise resources.

If there is a determination that the application is trusted (recall that the user is already operating within the enterprise), then policy module 60 essentially removes itself from interfering with this communication session. This is shown at 112. The user is free to continue using this particular application in order to access enterprise data over a standard link within the enterprise environment, as depicted at 116.

Alternatively, if the application where deemed to be untrusted such that tunneling to the Internet is appropriate (e.g., tunneling to the outside edge), then differential routing module 68 can be employed in order to provision a VPN tunnel for the application traffic. This is being shown at 114. Alternatively, VLAN tagging (or any other appropriate marking) can be used in order to appropriately route the packets using the existing infrastructure. From this point, the application can function normally whether it is being routed unencumbered toward some enterprise site (e.g., finance server 34 of FIG. 1), or it is being routed over a VPN tunnel to the Internet.

Figure 2C:
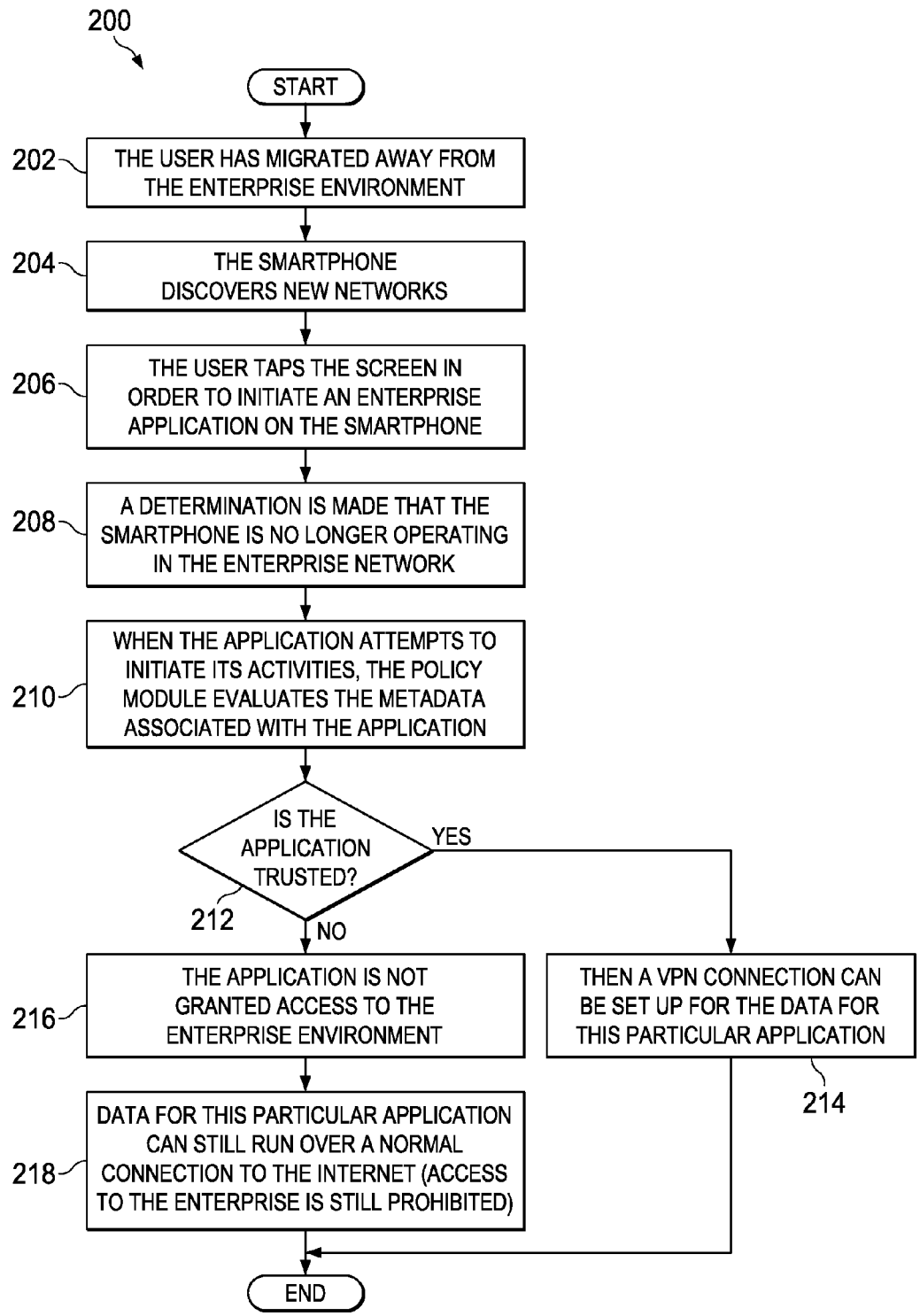
FIG. 2C is another simplified flowchart that illustrates potential operations that may be associated with an embodiment of the communication system.

FIG. 2C is a simplified flowchart 200 illustrating another set of possible activities associated with communication system 10. In this particular example, the user has migrated away from the enterprise environment (shown at 202). For example, the user may have left the enterprise environment in order to drink coffee at the local Starbucks. As the user migrates to the Starbucks location, the smartphone can discover new networks (e.g., possibly latch onto a Wi-Fi network, onto a 3G network, etc.). This is being shown at 204.

Once inside the Starbucks, in this particular example, the user taps the screen in order to initiate an enterprise application on the smartphone (e.g., a human resources (HR) application that offers the status of the user's last paycheck). This is being shown at 206, where the smartphone would attempt to initiate the application, as requested by the end user. A location determination is made that the smartphone is no longer operating in the enterprise network at 208 (e.g., the location determination can be made by the endpoint itself, or this may involve network admission control 78). When the application attempts to begin its activities (e.g., accessing the network, requesting information, etc.), policy module 60 evaluates the metadata associated with the application at 210. For example, policy module 60 can access policy definition module 62 in order to identify whether this particular application is trusted or untrusted. These determination activities are generally being shown at 212.

If the application is trusted, then a VPN connection is established for the data for this particular application at 214. If the application were untrusted, then the application would not be granted access to the enterprise data at 216. As an option, data for this particular application can still run over a normal connection to the Internet; however, access to the enterprise resources would still be prohibited. This is being depicted at 218.

It should be noted that decisions whether to send data over a VPN (or not) can be made at various times: not exclusive to when an application is launched. The decision whether the application is trusted can be first made when the application is launched. Similarly, a determination of whether the device is on the corporate network can also be made, where an initial routing decision is executed. However, any time the device roams to a different network and, further, any time any of the attributes (which were initially consulted in deciding whether an application is trusted) change, the decision process can happen anew. Hence, routing of the application's data traffic can potentially change at various time intervals. In a simplistic case, this explains why when a user walks into a corporate (e.g., work/enterprise) building, the traffic from an application can flip from being on a VPN, to being provided on the corporate network (or vice versa). Additionally, for more complex cases in which environmental factors are affecting trust, the same process can take place when those attributes change.

Note also that to handle changes in a policy, periodic reevaluation of a policy is appropriate. If this did not occur, then once an application was deemed trusted or not, it would be problematic to allow that determination to remain static (i.e., the determination would not change until the next time the application were launched (or until some environmental factor changed)). Instead, certain implementations of the present disclosure involve a periodic (or systematic) evaluating of policies, such that data traffic management decisions can be updated, modified, or otherwise changed.

Turning to FIG. 3, FIG. 3 illustrates a simplified table 80 associated with a plurality of applications to be evaluated for purposes of routing their data traffic. In this particular example, table 80 includes a Cisco directory application, a beer application, a Salesforce Version 1.3 application, an online dating application, and an Oracle application. Table 80 is configured to identify whether a given application is trusted/untrusted, identify the number of downloads for a particular application, identify an origin of an application (e.g., a geographic area), identify a manufacturer associated with an application, identify metadata associated with an application, and identify reputation characteristics for an application (e.g., excellent, poor, average, etc.). In particular implementations, table 80 may be provisioned at endpoint 12 (e.g., within policy definition module 62), and/or provisioned at any other appropriate location in the network (e.g., policy definition database 56).

The data of table 80 can be used as a basis to make determinations about how to route application data in the network, as discussed above. For example, the number of downloads can be tracked such that (in certain instances), the higher the number of downloads, the more trusted the application would be considered. Other categories could include locations and reputational data, where a quick lookup could be performed as the application is sought to be initiated at the endpoint. Any other suitable application characteristic can be used, where such information can be suitably provided in table 80 in order to make intelligent decisions about which applications would be considered trusted/untrusted.

As used herein in this Specification, the term 'application characteristic' is a broad term meant to encompass any of the aforementioned characteristics (e.g., such as those provisioned in table 80), or additional application characteristics, attributes, parameters, identifiers, descriptors, etc. to be used in making determinations about which applications are trusted or untrusted. Note that metadata can be used in order to represent these application characteristics. Along similar lines, the term 'trusted' as used herein is meant to encompass any type of classification, categorization, affirmation, labeling, sorting, grouping, or identification of certain applications that are not expected to pose a security threat (e.g., in the enterprise environment). The security threat could be related to any type of unauthorized behavior, malicious software, data leakage, data theft, improper access, virus/malware, etc. The term 'determining' is broad and, therefore, meant to include any type of evaluating, analyzing, reviewing, inspecting, or identifying activities.

Note also that the designations of trusted/untrusted applications can be entirely proprietary. Stated in different terminology, it is understood that different enterprises can make different tradeoffs between security and other business objectives. For example, what certain financial and healthcare companies may permit (in terms of trusted versus untrusted applications) may be significantly different from what would be permitted by universities, hotels, etc.

It should be noted that while previous discussions have addressed whether an application is trusted or untrusted, the present disclosure also includes the more nuanced case where the application is trusted by company A and not by company B. Thus, the policies applied to the application may depend on the precise location in the network (e.g., at home, inside company A, inside company B, etc.). The trusted/untrusted decision is not simply binary, but may also depend on the network location. In other cases, the location would not factor into the determination of whether the application is trusted.

In regards to the internal structure associated with communication system 10, each endpoint 12 and/or server 54 can include memory elements (as shown in FIG. 2A) for storing information to be used in achieving operations as outlined herein. Additionally, each of these devices may include a processor that can execute software or an algorithm to perform the activities discussed herein. These devices may further keep information in any suitable memory element (e.g., random access memory (RAM), read only memory (ROM), an erasable programmable read only memory (EPROM), application specific integrated circuit (ASIC), etc.), software, hardware, or in any other suitable component, device, element, or object where appropriate and based on particular needs. Any of the memory items discussed herein should be construed as being encompassed within the broad term 'memory element.' The information being stored, tracked, or sent by endpoint 12 and/or server 54 could be provided in any database, queue, register, table, control list, or storage structure, all of which can be referenced at any suitable timeframe. Any such storage options are included within the broad term 'memory element' as used herein. Similarly, any of the potential processing elements, modules, and machines described herein should be construed as being encompassed within the broad term 'processor.' Each of endpoint 12 and server 54 can also include suitable interfaces for receiving, transmitting, and/or otherwise communicating data or information in a network environment.

In one example implementation, endpoint 12 and/or server 54 may include software to achieve, or to foster, the routing management operations outlined herein. In other embodiments, these operations may be provided externally to these elements, or included in some other network device to achieve this intended functionality. Alternatively, these elements may include software (or reciprocating software) that can coordinate in order to provide the routing management operations, as outlined herein. In still other embodiments, one or all of these devices may include any suitable algorithms, hardware, software, components, modules, interfaces, or objects that facilitate the operations thereof.

Note that in certain example implementations, functions outlined herein may be implemented by logic (e.g., software, processor instructions, etc.) encoded in one or more tangible media (e.g., embedded logic provided in an ASIC, in digital signal processor (DSP) instructions, software (potentially inclusive of object code and source code) to be executed by a processor, or other similar machine, etc.). In some of these instances, memory elements (as shown in FIG. 2A) can store data used for the operations described herein. This includes the memory elements being able to store code that can be executed to carry out the activities described herein. A processor can execute any type of code associated with the data to achieve the operations detailed herein. In one example, the processors (as shown in FIG. 2A) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an EPROM, EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of endpoints. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a module is provided within the endpoints, these elements can be provided externally, or consolidated and/or combined in any suitable fashion. In certain instances, certain elements may be provided in a single proprietary module, device, unit, etc.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    identifying a network location of an endpoint, which is attempting to initiate an application;
    identifying, based at least in part on the network location of the endpoint, whether the endpoint is operating in an enterprise environment;
    determining whether the application is trusted based on metadata associated with the application, wherein the determining comprises:
        transmitting a hash of the application to an application database, and
        receiving, from the application database, a policy designating how data traffic associated with the application is to be routed in a network based on the hash of the application;
    provisioning, based on the policy, a tunnel for the data traffic associated with the application if the application is not trusted, and the endpoint is operating within the enterprise environment, wherein the data traffic associated with the application is tunneled to an enterprise edge for access to the Internet and the application is isolated from accessing enterprise data in the enterprise environment, wherein packets of the data traffic are tagged with the metadata, the metadata comprising a user identifier corresponding to the application on a per endpoint basis, and wherein the provisioning comprises routing the packets over the tunnel at a socket level based on the user identifier in the metadata; and
    not provisioning, based on the policy, the tunnel for the data traffic associated with the application if the application is trusted, and the endpoint is operating within the enterprise environment, wherein a first subset of the data traffic associated with the application is generated by a plugin loaded by the application, and subsequently provisioning the tunnel only for the first subset based on whether a combination of the application and the plugin is trusted.

2. The method of claim 1, wherein the tunnel is one of a plurality of tunnels for the application, and the method further comprises determining which of the plurality of tunnels for the application over which to route each of the packets of the data traffic based on a plurality of policies for the application.

3. The method of claim 1, wherein one or more application characteristic is used in order to identify whether the application is trusted, the one or more application characteristic comprising a number of downloads associated with the application and a geographic area of origin of the application, wherein the application is more likely to be trusted as the number of downloads increases, the geographic area of origin of the application is one of a plurality of geographic areas, and some of the plurality of geographic areas correspond to a higher likelihood that the application is trusted relative to others of the plurality of geographic areas.

4. The method of claim 1, wherein outgoing packets of the data traffic, from the endpoint, are routed over the tunnel based on a tag, applied by the endpoint to the outgoing packets, corresponding to a level of trust.

5. The method of claim 1, wherein the endpoint is configured to download a list of application hashes, which are used to identify whether a subsequent application is trusted.

6. The method of claim 1, wherein the determining further comprises sending a remote query when attempting to initiate the application in order to receive the policy designating how the data traffic is to be routed in the network.

7. The method of claim 1, wherein the network location is identified using a network admission control element.

8. One or more non-transitory computer-readable media that includes code for execution and when executed by a processor operable to perform operations comprising:
   identifying a network location of an endpoint, which is attempting to initiate an application;
   identifying, based at least in part on the network location of the endpoint, whether the endpoint is operating in an enterprise environment;
   determining whether the application is trusted based on metadata associated with the application, wherein the determining comprises:
      transmitting a hash of the application to an application database, and
      receiving, from the application database, a policy designating how data traffic associated with the application is to be routed in a network based on the hash of the application;
   provisioning, based on the policy, a tunnel for the data traffic associated with the application if the application is not trusted, and the endpoint is operating within the enterprise environment, wherein the data traffic associated with the application is tunneled to an enterprise edge for access to the Internet and the application is isolated from accessing enterprise data in the enterprise environment, wherein packets of the data traffic are tagged with the metadata, the metadata comprising a user identifier corresponding to the application on a per endpoint basis, and wherein the provisioning comprises routing the packets over the tunnel at a socket level based on the user identifier in the metadata; and
   not provisioning, based on the policy, the tunnel for the data traffic associated with the application if the application is trusted, and the endpoint is operating within the enterprise environment, wherein a first subset of the data traffic associated with the application is generated by a plugin loaded by the application, and subsequently provisioning the tunnel only for the first subset based on whether a combination of the application and the plugin is trusted.

9. The one or more non-transitory computer-readable media of claim 8, wherein the tunnel is one of a plurality of tunnels for the application, and the operations further comprise determining which of the plurality of tunnels for the application over which to route each of the packets of the data traffic based on a plurality of policies for the application.

10. The one or more non-transitory computer-readable media of claim 8, wherein one or more application characteristic is used in order to identify whether the application is trusted, the one or more application characteristic comprising a number of downloads associated with the application and a geographic area of origin of the application, wherein the application is more likely to be trusted as the number of downloads increases, the geographic area of origin of the application is one of a plurality of geographic areas, and some of the plurality of geographic areas correspond to a higher likelihood that the application is trusted relative to others of the plurality of geographic areas.

11. The one or more non-transitory computer-readable media of claim 8, wherein the endpoint is configured to download a list of application hashes, which are used to identify whether a subsequent application is trusted.

12. The one or more non-transitory computer-readable media of claim 8, wherein the network location is identified using a network admission control element.

13. An apparatus comprising:
   a memory element configured to store code;
   a processor operable to execute instructions associated with the code; and
   a policy module coupled to the memory element and the processor, wherein the apparatus is configured for:
      identifying an attempt, by an endpoint, to initiate an application;
      identifying, based at least in part on the attempt, whether the endpoint is operating in an enterprise environment;
      determining whether the application is trusted based on metadata associated with the application, wherein the determining comprises:
         transmitting a hash of the application to an application database, and
         receiving, from the application database, a policy designating how data traffic associated with the application is to be routed in a network based on the hash of the application;
      provisioning, based on the policy, a tunnel for the data traffic associated with the application if the application is not trusted, and the endpoint is operating within the enterprise environment, wherein the data traffic associated with the application is tunneled to an enterprise edge for access to the Internet and the application is isolated from accessing enterprise data in the enterprise environment, wherein packets of the data traffic are tagged with the metadata, the metadata comprising a user identifier corresponding to the application on a per endpoint basis, and wherein the provisioning comprises routing the packets over the tunnel at a socket level based on the user identifier in the metadata; and
      not provisioning, based on the policy, the tunnel for the data traffic associated with the application if the application is trusted, and the endpoint is operating within the enterprise environment, wherein a first subset of the data traffic associated with the application is generated by a plugin loaded by the application, and subsequently provisioning the tunnel only for the first subset based on whether a combination of the application and the plugin is trusted.

14. The apparatus of claim 13, wherein the tunnel is one of a plurality of tunnels for the application, and the policy module is further configured for determining which of the plurality of tunnels for the application over which to route each of the packets of the data traffic based on a plurality of policies for the application.

15. The apparatus of claim 13, wherein the policy module is further configured for downloading a list of application hashes, which are used to identify whether a subsequent application is trusted.

16. The apparatus of claim 13, wherein the determining further comprises sending a remote query when attempting to initiate the application in order to receive the policy designating how the data traffic is to be routed in the network.

17. The apparatus of claim 13, further comprising:
a server configured to use a network admission control element in order to identify the network location.

18. An apparatus comprising:
a memory element configured to store code;
a processor operable to execute instructions associated with the code; and
a policy module coupled to the memory element and the processor, wherein the apparatus is configured for:
  downloading a list of application hashes, which are stored with metadata and used to identify whether an application, initiated by an endpoint, is trusted;
  communicating a remote query in order to receive a policy designating routing for data traffic associated with the application, wherein the communicating comprises:
    transmitting a hash of the application to an application database, and
    receiving, from the application database, the policy designating how the data traffic associated with the application is to be routed in a network based on the hash of the application;
  provisioning, based on the policy, a tunnel for the data traffic associated with the application if the application is not trusted, and the endpoint is operating within the enterprise environment, wherein the data traffic associated with the application is tunneled to an enterprise edge for access to the Internet and the application is isolated from accessing enterprise data in the enterprise environment, wherein packets of the data traffic are tagged with the metadata, the metadata comprising a user identifier corresponding to the application on a per endpoint basis, and wherein the provisioning comprises routing the packets over the tunnel at a socket level based on the user identifier in the metadata; and
  not provisioning, based on the policy, the tunnel for the data traffic associated with the application if the application is trusted, and the endpoint is operating within the enterprise environment, wherein a first subset of the data traffic associated with the application is generated by a plugin loaded by the application, and subsequently provisioning the tunnel only for the first subset based on whether a combination of the application and the plugin is trusted.

19. The method of claim 1, further comprising differentially applying the policy to the application based on the enterprise environment by:
determining that the application is trusted when the enterprise environment a first company, and
determining that the application is untrusted when the enterprise environment is a second company.

20. The apparatus of claim 13, wherein one or more application characteristic is used in order to identify whether the application is trusted, the one or more application characteristic comprising a number of downloads associated with the application and a geographic area of origin of the application, wherein the application is more likely to be trusted as the number of downloads increases, the geographic area of origin of the application is one of a plurality of geographic areas, and some of the plurality of geographic areas correspond to a higher likelihood that the application is trusted relative to others of the plurality of geographic areas.

21. The apparatus of claim 18, wherein one or more application characteristic is used in order to identify whether the application is trusted, the one or more application characteristic comprising a number of downloads associated with the application and a geographic area of origin of the application, wherein the application is more likely to be trusted as the number of downloads increases, the geographic area of origin of the application is one of a plurality of geographic areas, and some of the plurality of geographic areas correspond to a higher likelihood that the application is trusted relative to others of the plurality of geographic areas.

* * * * *